United States Patent
Mo (10) Patent No.: US 12,023,868 B1
(45) Date of Patent: Jul. 2, 2024

(54) CONTROL METHOD, CONTROL SYSTEM, READABLE STORAGE MEDIUM AND 3D PRINTING EQUIPMENT

(71) Applicant: Shenzhen Anycubic Technology Co., Ltd., Shenzhen (CN)

(72) Inventor: Zhifeng Mo, Shenzhen (CN)

(73) Assignee: SHENZHEN ANYCUBIC TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/227,995

(22) Filed: Jul. 31, 2023

(30) Foreign Application Priority Data

May 31, 2022 (CN) .......................... 202210608939.0

(51) Int. Cl.
*B29C 64/386* (2017.01)
*B33Y 50/00* (2015.01)
*B33Y 30/00* (2015.01)

(52) U.S. Cl.
CPC ............. *B29C 64/386* (2017.08); *B33Y 30/00* (2014.12); *B33Y 50/00* (2014.12)

(58) Field of Classification Search
CPC ..... B29C 64/386; B29C 64/393; B33Y 30/00; B33Y 50/00; B33Y 50/02
See application file for complete search history.

(56) References Cited

U.S. PATENT DOCUMENTS

| | | | |
|---|---|---|---|
| 2002/0156594 A1* | 10/2002 | Houge | G03F 7/70625 702/127 |
| 2010/0262272 A1 | 10/2010 | Shkolnik et al. | |
| 2017/0210077 A1 | 7/2017 | Ermoshkin et al. | |
| 2017/0368756 A1 | 12/2017 | Sanz Ananos et al. | |
| 2018/0029292 A1* | 2/2018 | Samulski | B29C 64/393 |
| 2019/0086899 A1 | 3/2019 | Wang et al. | |
| 2019/0210106 A1 | 7/2019 | Gibson et al. | |
| 2019/0291184 A1 | 9/2019 | Buller et al. | |
| 2019/0315051 A1 | 10/2019 | Stadlmann | |
| 2020/0001363 A1 | 1/2020 | Gibson et al. | |
| 2021/0114097 A1* | 4/2021 | Hatch | B33Y 30/00 |

(Continued)

FOREIGN PATENT DOCUMENTS

| | | |
|---|---|---|
| CN | 107150439 A | 9/2017 |
| CN | 108327253 A | 7/2018 |
| CN | 110978502 A | 4/2020 |

(Continued)

*Primary Examiner* — Yuhui R Pan
(74) *Attorney, Agent, or Firm* — Bayramoglu Law Offices LLC (57) ABSTRACT

A control method, a control system, a readable storage medium, and a 3D printing equipment are provided. The method includes; obtaining at least one parameter of an exposure time of a first-type slice and an exposure time of a third-type slice of a model to be printed; obtaining a quantity of printing layers for a second-type slice of the model to be printed; determining an exposure time of the second-type slice and processing the model to be printed based on the exposure time of the first-type slice, the second-type slice and the third-type slice. By setting an exposure time appropriately, a transition layer is defined for the model to be printed, to facilitate a transition of an exposure time of bottom layers, which enhances connection strength between printing layers and reduces a possibility of model cracking.

20 Claims, 2 Drawing Sheets

(56) References Cited

U.S. PATENT DOCUMENTS

2021/0229364 A1 7/2021 McLeod et al.
2021/0402678 A1 12/2021 You et al.

FOREIGN PATENT DOCUMENTS

| CN | 111497231 | A | 8/2020 |
| CN | 112440471 | A | 3/2021 |
| CN | 112519232 | A | 3/2021 |
| CN | 112976579 | A | 6/2021 |
| EP | 3953157 | A1 | 2/2022 |
| WO | 2014074954 | A2 | 5/2014 |
| WO | 2021253770 | A1 | 12/2021 |
| WO | 2022007423 | A1 | 1/2022 |
| WO | 2022027245 | A1 | 2/2022 |

* cited by examiner

CONTROL METHOD, CONTROL SYSTEM, READABLE STORAGE MEDIUM AND 3D PRINTING EQUIPMENT

CROSS REFERENCE TO THE RELATED APPLICATIONS

This application is based upon and claims priority to Chinese Patent Application No. 202210608939.0 filed on May 31, 2022, the entire contents of which are incorporated herein by reference.

TECHNICAL FIELD

The present application relates to the technical field of 3D printing equipments, and in particular, to a control method, a control system, a readable storage medium, and a 3D printing equipment.

BACKGROUND

In the prior art, a printing platform of a photocuring printer is gradually lifted up during model printing. Therefore, significant adhesion is required between bottom layers of a model and the printing platform. To ensure good adhesion, an exposure time of the bottom layers of the model is usually set to be longer, which improves the adhesion between the model and the printing platform. However, to improve the printing efficiency of the model, an exposure time of other printing layers of the model is usually set to be shorter. As a result, a UV exposure (photopolymer exposure) time of the bottom layer is greatly different from that of a subsequent printing layer. This may cause a sudden change in energy required for intermolecular forces between layers of the same material, and further cause uncured cracking between the bottom layer and other printing layers, which severely affects the printing quality of the model.

SUMMARY

In view of this, the present application provides a control method, a control system, a readable storage medium, and a 3D printing equipment. By setting an exposure time appropriately, transition layers are defined for a model to be printed, to facilitate a transition of an exposure time of bottom layers, which enhances connection strength between printing layers and reduces a possibility of model cracking.

According to one aspect of the present application, a control method for 3D printing is provided. The method includes:
  obtaining at least one parameter of an exposure time of a first-type slice and an exposure time of a third-type slice of a model to be printed;
  obtaining a quantity of printing layers for a second-type slice of the model to be printed;
  determining an exposure time of the second-type slice based on the at least one parameter of the exposure time of the first-type slice and the exposure time of the third-type slice, and the quantity of printing layers for the second-type slice; and
  processing the model to be printed based on the exposure time of the first-type slice, the exposure time of the second-type slice, and the exposure time of the third-type slice;
  where the second-type slice is located between the first-type slice and the third-type slice.

Optionally, the determining an exposure time of the second-type slice based on the at least one parameter of the exposure time of the first-type slice and the exposure time of the third-type slice, and the quantity of printing layers for the second-type slice includes:
  determining an exposure time of the second-type slice based on the exposure time of the first-type slice or the exposure time of the third-type slice, and the quantity of printing layers for the second-type slice; or
  determining an exposure time of the second-type slice based on the exposure time of the first-type slice and the exposure time of the third-type slice, and the quantity of printing layers for the second-type slice.

Optionally, the determining an exposure time of the second-type slice based on the exposure time of the first-type slice or the exposure time of the third-type slice, and the quantity of printing layers for the second-type slice includes:
  obtaining a preset exposure time difference of the second-type slice; and
  determining the exposure time of the second-type slice based on the exposure time of the first-type slice or the exposure time of the third-type slice, the quantity of printing layers for the second-type slice, and the preset exposure time difference.

Optionally, the determining an exposure time of the second-type slice based on the exposure time of the first-type slice and the exposure time of the third-type slice, and the quantity of printing layers for the second-type slice includes:
  calculating a difference between the exposure time of the first-type slice and the exposure time of the third-type slice;
  determining a quotient of the difference and the quantity of printing layers for the second-type slice as an exposure time difference between two adjacent printing layers in the second-type slice; and
  performing an iterative operation based on one of the exposure time of the first-type slice and the exposure time of the third-type slice, and the exposure time difference, to determine an exposure time of each printing layer for the second-type slice.

Optionally, the control method for 3D printing further includes:
  obtaining a quantity of pixels of a current printing layer for the second-type slice and a quantity of pixels of a previous printing layer of the current printing layer; and
  updating an exposure time of the current printing layer based on a relationship between the quantity of pixels of the current printing layer and the quantity of pixels of the previous printing layer.

Optionally, the updating an exposure time of the current printing layer based on a relationship between the quantity of pixels of the current printing layer and the quantity of pixels of the previous printing layer includes:
  obtaining a ratio of the quantity of pixels of the current printing layer to the quantity of pixels of the previous printing layer as an exposure time coefficient, if the quantity of pixels of the current printing layer is not equal to the quantity of pixels of the previous printing layer; and
  updating the exposure time of the current printing layer based on the exposure time coefficient and the exposure time difference, or based on the exposure time coefficient and an exposure time before correction.

Optionally, the updating the exposure time of the current printing layer based on the exposure time coefficient and the exposure time difference includes:

when the exposure time coefficient is less than 1 and greater than a first threshold, obtaining a first product of the exposure time coefficient and the exposure time difference, and using a difference obtained by subtracting the first product from the exposure time before correction as a corrected exposure time of the current printing layer;

when the exposure time coefficient is less than or equal to the first threshold, obtaining a second product of the first threshold and the exposure time difference, and using a difference obtained by subtracting the second product from the exposure time before correction as a corrected exposure time of the current printing layer;

when the exposure time coefficient is greater than 1 and less than a second threshold, obtaining a third product of the exposure time coefficient and the exposure time difference, and using a sum of the exposure time before correction and the third product as a corrected exposure time of the current printing layer; or when the exposure time coefficient is greater than or equal to the second threshold, obtaining a fourth product of the second threshold and the exposure time difference, and using a sum of the exposure time before correction and the fourth product as a corrected exposure time of the current printing layer.

Optionally, the control method for 3D printing further includes:

obtaining a total quantity of printing layers for the model to be printed, a quantity of printing layers for the first-type slice, and the quantity of printing layers for the second-type slice; and determining a quantity of printing layers for the third-type slice based on the total quantity of printing layers, the quantity of printing layers for the first-type slice, and the quantity of printing layers for the second-type slice;

where the quantity of printing layers for the first-type slice is less than or equal to 20, and the quantity of printing layers for the second-type slice is generated through calculation based on at least one of the quantity of printing layers for the first-type slice and the quantity of printing layers for the third-type slice; or the quantity of printing layers for the second-type slice is a preset fixed value.

According to another aspect of the present application, a control system is provided. The system includes:

an obtaining module, configured to: obtain at least one parameter of an exposure time of a first-type slice and an exposure time of a third-type slice of a model to be printed; and obtain a quantity of printing layers for a second-type slice of the model to be printed;

a determining module, configured to determine an exposure time of the second-type slice based on the at least one parameter of the exposure time of the first-type slice and the exposure time of the third-type slice, and the quantity of printing layers for the second-type slice; and a processing module, configured to process the model to be printed based on the exposure time of the first-type slice, the exposure time of the second-type slice, and the exposure time of the third-type slice.

Optionally, the determining module is specifically configured to: determine an exposure time of the second-type slice based on the exposure time of the first-type slice or the exposure time of the third-type slice, and the quantity of printing layers for the second-type slice; or determine an exposure time of the second-type slice based on the exposure time of the first-type slice and the exposure time of the third-type slice, and the quantity of printing layers for the second-type slice.

Optionally, the determining module is specifically configured to: obtain a preset exposure time difference of the second-type slice, and determine the exposure time of the second-type slice based on the exposure time of the first-type slice or the exposure time of the third-type slice, the quantity of printing layers for the second-type slice, and the preset exposure time difference.

Optionally, the determining module is specifically configured to: calculate a difference between the exposure time of the first-type slice and the exposure time of the third-type slice; determine a quotient of the difference and the quantity of printing layers for the second-type slice as an difference between two adjacent printing layers in the second-type slice; and perform an iterative operation based on one of the exposure time of the first-type slice and the exposure time of the third-type slice, and the exposure time difference, to determine an exposure time of each printing layer for the second-type slice.

Optionally, the obtaining module is further configured to obtain a quantity of pixels of a current printing layer for the second-type slice and a quantity of pixels of a previous printing layer of the current printing layer; and the control system further includes: an update module, configured to update an exposure time of the current printing layer based on a relationship between the quantity of pixels of the current printing layer and the quantity of pixels of the previous printing layer.

Optionally, the update module is specifically configured to: obtain a ratio of the quantity of pixels of the current printing layer to the quantity of pixels of the previous printing layer as an exposure time coefficient, when the quantity of pixels of the current printing layer is not equal to the quantity of pixels of the previous printing layer; and update the exposure time of the current printing layer based on the exposure time coefficient and the exposure time difference, or based on the exposure time coefficient and an exposure time before correction.

Optionally, the update module is specifically configured to: when the exposure time coefficient is less than 1 and greater than a first threshold, obtain a first product of the exposure time coefficient and the exposure time difference, and use a difference obtained by subtracting the first product from the exposure time before correction as a corrected exposure time of the current printing layer; when the exposure time coefficient is less than or equal to the first threshold, obtain a second product of the first threshold and the exposure time difference, and use a difference obtained by subtracting the second product from the exposure time before correction as a corrected exposure time of the current printing layer; when the exposure time coefficient is greater than 1 and less than a second threshold, obtain a third product of the exposure time coefficient and the exposure time difference, and use a sum of the exposure time before correction and the third product as a corrected exposure time of the current printing layer; or when the exposure time coefficient is greater than or equal to the second threshold, obtain a fourth product of the second threshold and the exposure time difference, and use a sum of the exposure time before correction and the fourth product as a corrected exposure time of the current printing layer.

Optionally, the obtaining module is further configured to: obtain a total quantity of printing layers for the model to be printed, a quantity of printing layers for the first-type slice, and the quantity of printing layers for the second-type slice;

and determine a quantity of printing layers for the third-type slice based on the total quantity of printing layers, the quantity of printing layers for the first-type slice, and the quantity of printing layers for the second-type slice; where the quantity of printing layers for the first-type slice is less than or equal to 20, and the quantity of printing layers for the second-type slice is generated through calculation based on at least one of the quantity of printing layers for the first-type slice and the quantity of printing layers for the third-type slice; or the quantity of printing layers for the second-type slice is a preset fixed value.

According to still another aspect of the present application, a computer-readable storage medium is provided, where the computer-readable storage medium stores a computer program, and the computer program is configured to: when running, perform the foregoing control method for 3D printing.

According to yet another aspect of the present application, a 3D printing equipment is provided, including:
 a memory, configured to store a computer program; and
 a processor, configured to invoke the computer program to perform, on a model to be printed, the foregoing control method for 3D printing.

According to the foregoing technical solutions, a plurality of printing layers and printing parameters of the model to be printed are obtained during model printing, to instruct, based on the printing parameters, a three-dimensional printing equipment to print the model to be printed. Further, the plurality of printing layers of the model to be printed are divided into three types: the first-type slice, the second-type slice, and the third-type slice. Therefore, when a processing operation is performed on the model to be printed, the exposure time of the second-type slice is appropriately set, so that the second-type slice can connect the first-type slice and the third-type slice, preventing the third-type slice from falling off due to a large difference between the exposure time of the third-type slice and the exposure time of the first-type slice. This not only ensures good adhesion between a printed first-type slice and a printing platform, but also enhances connection strength between printing layers of the model to be printed, which reduces a possibility of cracking and helps improve the printing quality of the model.

The above description is merely a summary of the technical solutions of the present application. To make the technical means of the present application more clearly understood and implemented according to the contents of the description, and to make the above and other objectives, features, and advantages of the present application more obvious and comprehensible, the embodiments of the present application are described in detail below.

BRIEF DESCRIPTION OF THE DRAWINGS

The accompanying drawings described herein are intended to provide a further understanding of the present application, and form a part of the present application. The illustrative embodiments of the present application and the description thereof are for explaining the present application and do not unduly limit the present application. In the figures.

DETAILED DESCRIPTION OF THE EMBODIMENTS

The present application will be described below in detail with reference to the accompanying drawings and in conjunction with the embodiments. It should be noted that, in the case of no conflict, the embodiments and the features thereof in the present application can be combined with each other.

Embodiments of the present application will be described below in detail, and examples of the embodiments are shown in the drawings, where the same or similar reference numerals represent the same or similar elements or elements having the same or similar functions throughout. The embodiments described below with reference to the accompanying drawings are examples only for explaining the present application, and should not be construed as a limitation on the present application.

Those skilled in the art can understand that singular forms of "a", "an", "said" and "the" used herein may also include plural forms, unless specifically stated. It should be further understood that the word "include" used in the description of this application refers to the presence of the described features, integers, steps, operations, elements, and/or components, but does not exclude the presence or addition of one or more other features, integers, steps, operations, elements, components, and/or groups thereof. It should be understood that when an element is referred to as being "connected" or "coupled" to another element, the element may be directly connected or coupled to the another element, or an intermediate element may also be present. In addition, "connection" or "coupling" used herein may include a wireless connection or a wireless coupling. The word "and/or" used herein includes any or all of one or more related listed items and all combinations thereof.

Example embodiments according to the present application are described in more detail with reference to the accompanying drawings. However, these example embodiments may be implemented in many different forms, and should not be construed as being limited only to the embodiments described herein. It should be understood that these embodiments are provided to thoroughly and completely disclose the present application, and fully convey the concept of these example embodiments to those of ordinary skill in the art.

Figure 1:
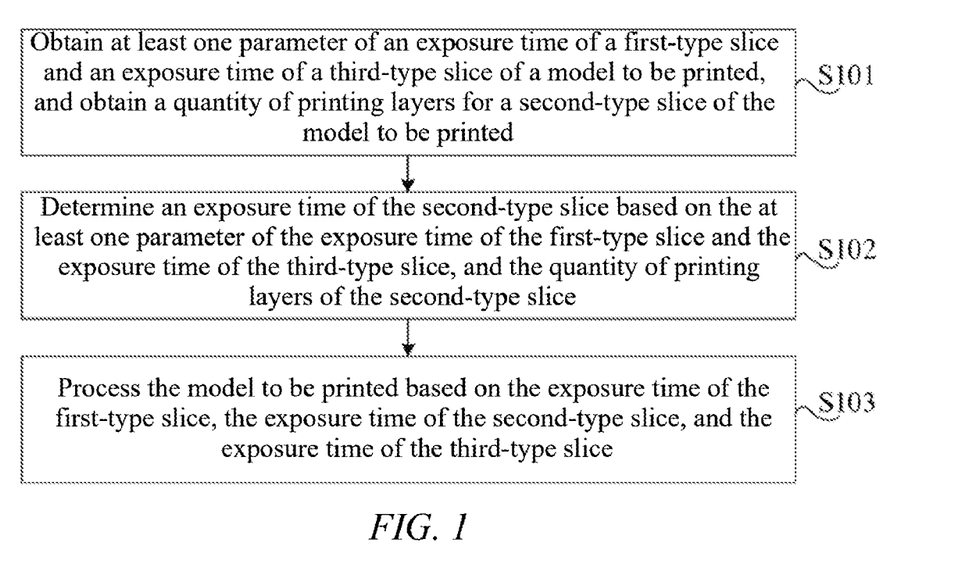
FIG. 1 is a first schematic flowchart of a control method for 3D printing according to an embodiment of the present application.

An embodiment provides a control method. As shown in FIG. 1, the control method includes the following steps.

S101: Obtain at least one parameter of an exposure time of a first-type slice and an exposure time of a third-type slice of a model to be printed, and obtain a quantity of printing layers for a second-type slice of the model to be printed.

The exposure time of the first-type slice is an exposure time required for printing each printing layer for the first-type slice. Similarly, the exposure time of the third-type slice is an exposure time required for printing each printing layer for the third-type slice. The quantity of printing layers for the second-type slice is a quantity of all printing layers for the second-type slice.

In this embodiment, a plurality of printing layers and preset printing parameters of the model to be printed are obtained during model printing, to instruct, based on the preset printing parameters, a three-dimensional printing equipment to print the model to be printed. In addition, the plurality of printing layers of the model to be printed are divided into three types: the first-type slice, the second-type slice, and the third-type slice, and the second-type slice is used to connect the first-type slice and the third-type slice. The first-type slice is bottom layers of the model to be printed or a first printing layer, which is a part of the model to be printed that can be in contact with a printing platform. When bottom layers need to be added at the bottom of the model to be printed, the first-type slice is the bottom layers of the model to be printed. When no bottom layers need to be added at the bottom of the model to be printed, the first-type slice is the first printing layer of the model to be printed. The second-type slice is a transition layer of the model to be printed, which is used to connect the bottom layers or the first printing layer of the model to be printed and a subsequent printing layer. The third-type slice is regular layers, they are printing layers in the model to be printed other than the first-type slice (that is, the bottom layers or the first printing layer of the model to be printed) and the second-type slice (that is, the transition layers).

It should be noted that the second-type slice is usually located between the first-type slice and the third-type slice among the plurality of printing layers, that is, a quantity of layers for the second-type slice is greater than that for the first-type slice and less than that for the third-type slice among the plurality of printing layers.

It can be understood that, to balance the adhesion between the first-type slice and the printing platform and the printing efficiency of the model, the exposure time of the first-type slice is greater than the exposure time of the third-type slice.

In this embodiment of the present application, if the first-type slice is the bottom layers of the model to be printed, a quantity of printing layers for the first-type slice may be preset to be one or more, and exposure times of all printing layers for the first-type slice are the same; or if the first-type slice is the first printing layer of the model to be printed, a quantity of printing layers for the first-type slice is one. A quantity of printing layers for the third-type slice is usually set to be greater than one, and exposure times of all printing layers for the third-type slice are the same. The second-type slice may include at least one printing layer. When the second-type slice includes a plurality of printing layers, an exposure time of the second-type slice gradually decreases as the quantity of printing layers for the second-type slice increases. In this way, the exposure time of the second-type slice can be transitioned stepwise from the exposure time of the first-type slice to the exposure time of the third-type slice, to avoid a large difference between exposure times of adjacent printing layers, and alleviate a sudden change in energy required for intermolecular forces between layers of the same material. This ensures stability of a cross-linked structure of two printing layers, effectively reduces model curing cracking, and further prevents an abnormal protrusion of the transition layer.

S102: Determine the exposure time of the second-type slice based on the at least one parameter of the exposure time of the first-type slice and the exposure time of the third-type slice, and the quantity of printing layers for the second-type slice.

It can be understood that, because the second-type slice serves as a transition layer for connecting the first-type slice and the second-type slice, to prevent uncured cracking between the first-type slice and the third-type slice due to a large difference between the exposure time of the first-type slice and the exposure time of the third-type slice, the exposure time of the second-type slice should be less than the exposure time of the first-type slice and greater than the exposure time of the third-type slice.

As an elaboration and expansion of a specific implementation of the embodiment of S102, to fully describe a specific implementation process of this embodiment, in an embodiment, S102 includes: determining the exposure time of the second-type slice based on at least one of the exposure time of the first-type slice and the exposure time of the third-type slice, and the quantity of printing layers for the second-type slice.

The determining the exposure time of the second-type slice based on the exposure time of the first-type slice or the exposure time of the third-type slice, and the quantity of printing layers for the second-type slice includes the following steps.

S102-1: Obtain a preset exposure time difference of the second-type slice.

S102-2: Determine the exposure time of the second-type slice based on the exposure time of the first-type slice or the exposure time of the third-type slice, the quantity of printing layers for the second-type slice, and the preset exposure time difference.

It can be understood that the exposure time difference is a difference between an exposure time of any printing layer for the second-type slice and an exposure time of an adjacent printing layer, that is, an exposure time difference between two adjacent printing layers for the second-type slice. The exposure time difference, the exposure time of the first-type slice, and the exposure time of the third-type slice may be preset by slicing software or a 3D printing equipment or a user input.

In this embodiment, the exposure time of the first-type slice may be obtained as an initial value, and then sequentially decreased on the basis of the preset exposure time difference, to determine the exposure time of the second-type slice and the exposure time of the third-type slice, or the exposure time of the third-type slice may be obtained as an initial value, and then sequentially increased on the basis of the preset exposure time difference, to determine the exposure time of the second-type slice and the exposure time of the first-type slice. In this way, for a plurality of printing layers for the second-type slice, an exposure time sequentially decreases as a layer number increases, and an exposure time difference between any two adjacent printing layers is the same, avoiding a large difference between exposure times of adjacent printing layers and alleviating a sudden change in energy required for intermolecular forces between layers of the same material, while gradually reducing an exposure time of printing and helping improve the printing efficiency.

Figure 3:
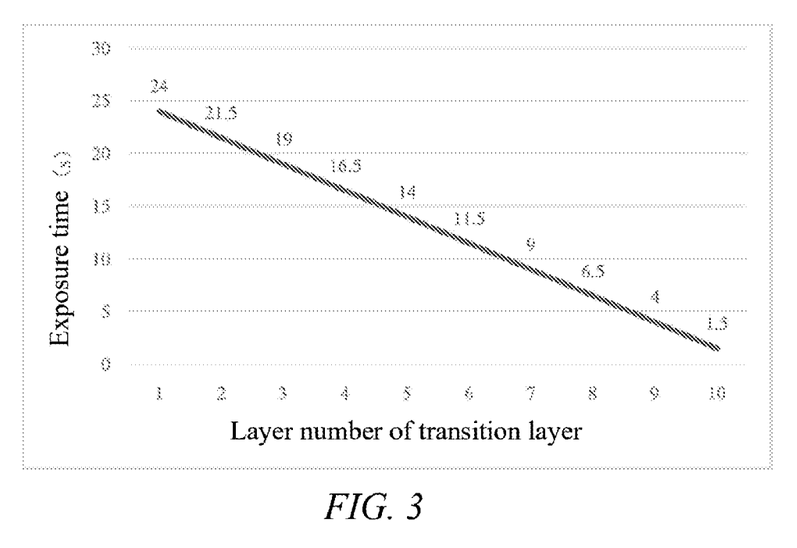
FIG. 3 is a schematic diagram of an exposure time of a second-type slice according to a specific embodiment of the present application.

Specifically, an iterative operation is performed based on the exposure time of the first-type slice and the preset exposure time difference by using the following formula: $T_i = T_{i-1} - \Delta t$, where $T_i$ indicates an exposure time of a current printing layer for the second-type slice, and $T_{i-1}$ indicates an exposure time of a previous printing layer of the current printing layer. If the current printing layer is the first printing layer for the transition layer, the previous printing layer is the bottom layers or the first printing layer of the model to be printed. In this case, $T_{i-1}$ is the exposure time of the first-type slice. For example, a quantity n of printing layers for the transition layer is 10, that is, the second-type slice includes 10 printing layers, an exposure time of the bottom layer or the first printing layer of the model to be printed is 26.5 s, and the preset exposure time difference is 2.5 s. A linear exposure graph of the second-type slice is shown in FIG. 3. An exposure time of the first printing layer for the second-type slice (the transition layer) is 24 s, and an exposure time of the second printing layer for the second-type slice (the transition layer) is 21.5 s. By analogy, an exposure time of each printing layer for the second-type slice is calculated. The exposure time of the third-type slice is $T_j=T_{i-1}-n\times\Delta t$, that is, the exposure time of the third-type slice is 1.5 s.

Alternatively, an iterative operation is performed based on the exposure time of the third-type slice and the exposure time difference by using the following formula: $T_i=T_{i+1}+\Delta t$, where $T_i$ indicates an exposure time of a current printing layer for the second-type slice, and $T_{i+1}$ indicates an exposure time of a next printing layer of the current printing layer. If the current printing layer is the last printing layer for the transition layer, the next printing layer is the first printing layer for the regular layer of the model to be printed. In this case, $T_{i+1}$ is the exposure time of the third-type slice. For example, a quantity n of printing layers for the transition layer is 10, that is, the second-type slice includes 10 printing layers, the exposure time of the third-type slice is 1.5 s, and the preset exposure time difference is 2.5 s. In this case, an exposure time of the last printing layer for the second-type slice (the transition layer) is 4 s, and an exposure time of the penultimate printing layer for the second-type slice (the transition layer) is 6.5 s. By analogy, an exposure time of each printing layer for the second-type slice is calculated. The exposure time of the first-type slice is $T_i=T_{i+1}+n\times\Delta t$, that is, the exposure time of the first-type slice is 26.5 s.

In another embodiment, S102 includes: determining the exposure time of the second-type slice based on the exposure time of the first-type slice and the exposure time of the third-type slice, and the quantity of printing layers for the second-type slice.

The determining the exposure time of the second-type slice based on the exposure time of the first-type slice and the exposure time of the third-type slice, and the quantity of printing layers for the second-type slice includes the following steps.

S102-3: Calculate a difference between the exposure time of the first-type slice and the exposure time of the third-type slice.

S102-4: Determine a quotient of the difference and the quantity of printing layers for the second-type slice as an exposure time difference between two adjacent printing layers in the second-type slice.

S102-5: Perform an iterative operation based on one of the exposure time of the first-type slice and the exposure time of the third-type slice, and the exposure time difference, to determine an exposure time of each printing layer for the second-type slice.

In this embodiment, the exposure time difference is calculated by using a preset algorithm. First, the difference between the exposure time of the first-type slice and the exposure time of the third-type slice that are preset is calculated. Then the difference is divided by the quantity of printing layers for the second-type slice to calculate an exposure time difference between two adjacent printing layers in the second-type slice. Finally, a decremental iterative operation is performed by using the exposure time difference as an iteration variable, the exposure time of the first-type slice as an initial value, and the quantity of printing layers for the second-type slice as a quantity of iterations, so that the exposure time of the second-type slice arithmetically decreases based on the exposure time of the first-type slice. Alternatively, an incremental iterative operation is performed by using the exposure time difference as an iteration variable, the exposure time of the third-type slice as an initial value, and the quantity of printing layers for the second-type slice as a quantity of iterations, so that the exposure time of the second-type slice arithmetically decreases based on the exposure time of the third-type slice. In this way, for a plurality of printing layers for the second-type slice, an exposure time sequentially decreases as a layer number increases, and an exposure time difference between any two adjacent printing layers is the same, avoiding a large difference between exposure times of adjacent printing layers and alleviating a sudden change in energy required for intermolecular forces between layers of the same material, while gradually reducing an exposure time of printing and helping improve the printing efficiency.

For example, the exposure time of the first-type slice is $T_k$, the exposure time of the third-type slice is $T_j$, and the quantity of printing layers for the second-type slice is n. In this case, a calculation formula for the exposure time difference is $\Delta t=(T_k-T_j)/n$. If the quantity of printing layers for the transition layer is 10, that is, the second-type slice includes 10 printing layers, the exposure time of the first-type slice is 26.5 s, and the exposure time of the third-type slice is 1.5 s, the exposure time difference is 2.5 s. A linear exposure graph of the second-type slice is shown in FIG. 3. An exposure time of the first printing layer for the second-type slice (the transition layer) is 24 s, an exposure time of the second printing layer for the second-type slice (the transition layer) is 21.5 s, and so on.

S103: Process the model to be printed based on the exposure time of the first-type slice, the exposure time of the second-type slice, and the exposure time of the third-type slice.

In this embodiment, the exposure time of each printing layer for the second-type slice is configured by using the exposure time of the first-type slice and the exposure time of the third-type slice that are preset. Therefore, when a printing operation is performed on the model to be printed, the first-type slice is printed based on the exposure time of the first-type slice, the second-type slice is printed based on the exposure time of the second-type slice, and the third-type slice is printed based on the exposure time of the third-type slice, thereby fulfilling the printing requirement of the model to be printed. In this way, the exposure time of each printing layer for the second-type slice is appropriately set, preventing a large difference between the exposure time of the first-type slice and an exposure time of a subsequent printing layer, so that the second-type slice can connect the first-type slice and the third-type slice. This can not only ensure good adhesion between a printed first-type slice and a printing platform, but can also enhance connection strength between printing layers of the model to be printed, which reduces a possibility of cracking and helps improve the printing quality of the model.

Figure 2:
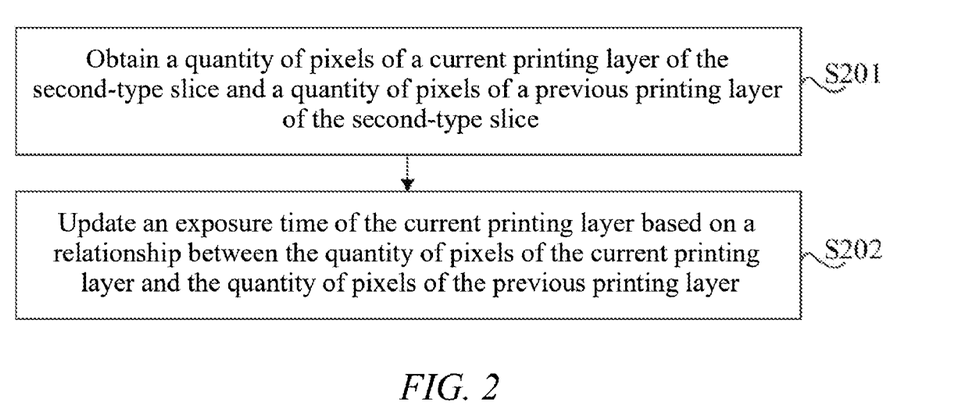
FIG. 2 is a second schematic flowchart of a control method for 3D printing according to an embodiment of the present application.

Further, as shown in FIG. 2, as an elaboration and expansion of a specific implementation of the foregoing embodiment, to fully describe a specific implementation process of this embodiment, the control method for 3D printing further includes the following steps.

S201: Obtain a quantity of pixels of a current printing layer for the second-type slice and a quantity of pixels of a previous printing layer for the second-type slice.

S202: Update an exposure time of the current printing layer based on a relationship between the quantity of pixels of the current printing layer and the quantity of pixels of the previous printing layer.

In this embodiment, during photocuring printing, a larger quantity of pixels of a printing layer indicates a higher complexity of an exposure pattern corresponding to a printing layer image, and a longer exposure time required for ensuring the printing quality. If sizes of exposure patterns of two adjacent printing layers are greatly different, the printing quality of the printing layers may not be ensured if a uniform exposure time is used. Therefore, the exposure time is corrected and updated by determining, through comparison, a relationship between quantities of pixels of two adjacent printing layers in the second-type slice. In this way, the exposure time of the current printing layer can better meet an actual requirement for the exposure time, ensuring the printing quality of the model while reducing a possibility of model cracking, thereby meeting various printing requirements of a user.

It can be understood that, in the present application, a printing layer image may be decoded by using a conventional pixel counting algorithm, to obtain the quantity of pixels of the current printing layer and the quantity of pixels of the previous printing layer. Examples of pixel counting algorithms are not described in this embodiment of the present application.

Further, as an elaboration and expansion of a specific implementation of the foregoing embodiment, to fully describe a specific implementation process of this embodiment, S202, that is, a method for updating the exposure time of the current printing layer based on the relationship between the quantity of pixels of the current printing layer and the quantity of pixels of the previous printing layer, specifically includes the following steps.

S202-1: Obtain a ratio of the quantity of pixels of the current printing layer to the quantity of pixels of the previous printing layer as an exposure time coefficient, if the quantity of pixels of the current printing layer is not equal to the quantity of pixels of the previous printing layer.

S202-2: Update the exposure time of the current printing layer based on the exposure time coefficient and the exposure time difference, or based on the exposure time coefficient and an exposure time before correction.

In this embodiment, if it is detected that the quantity of pixels of the current printing layer is not equal to the quantity of pixels of the previous printing layer, it indicates exposure patterns of two adjacent printing layers in the second-type slice are different, that is, a cross-linked structure of the two printing layers has a poor stability. In this case, the exposure time of the current printing layer is recalculated by using a quotient of the quantity of pixels of the current printing layer and the quantity of pixels of the previous printing layer as an exposure time coefficient, and based on the exposure time coefficient and the exposure time difference, or based on the exposure time coefficient and the exposure time before correction, so that the exposure time is appropriately decreased or increased based on the exposure time of the current printing layer before correction. In this way, the exposure time of the current printing layer can better meet an actual requirement for the exposure time, ensuring the printing quality of the model while reducing a possibility of model cracking, thereby meeting various printing requirements of a user.

In an actual application scenario, a method for updating the exposure time of the current printing layer based on the exposure time coefficient and the exposure time before correction may be specifically: using a product of the exposure time coefficient and the exposure time before correction as a corrected exposure time of the current printing layer.

In an actual application scenario, a method for updating the exposure time of the current printing layer based on the exposure time coefficient and the exposure time difference specifically includes the following cases:

When the exposure time coefficient is less than 1 and greater than a first threshold, obtaining a first product of the exposure time coefficient and the exposure time difference, and using a difference obtained by subtracting the first product from the exposure time before correction as a corrected exposure time of the current printing layer;

When the exposure time coefficient is less than or equal to the first threshold, obtaining a second product of the first threshold and the exposure time difference, and using a difference obtained by subtracting the second product from the exposure time before correction as a corrected exposure time of the current printing layer;

When the exposure time coefficient is greater than 1 and less than a second threshold, obtaining a third product of the exposure time coefficient and the exposure time difference, and using a sum of the exposure time before correction and the third product as a corrected exposure time of the current printing layer; or When the exposure time coefficient is greater than or equal to the second threshold, obtaining a fourth product of the second threshold and the exposure time difference, and using a sum of the exposure time before correction and the fourth product as a corrected exposure time of the current printing layer.

Specifically, because the exposure time coefficient is the ratio of the quantity of pixels of the current printing layer to the quantity of pixels of the previous printing layer, when the exposure time coefficient is less than 1, it indicates that the quantity of pixels of the current printing layer is less than the quantity of pixels of the previous printing layer. When the exposure time coefficient is greater than 1, it indicates that the quantity of pixels of the current printing layer is greater than the quantity of pixels of the previous printing layer.

Specifically, the first threshold and the second threshold are reasonably set based on a printing material and printing precision. In this embodiment of the present application, to prevent an excessively long or short exposure time of two adjacent printing layers from causing an increase of time required for printing the model and an excessively large difference between exposure times of layers, the first threshold and the second threshold are set to limit exposure times of two adjacent printing layers.

Specifically, when the exposure time coefficient is less than the first threshold or greater than the second threshold, it indicates that quantities of pixels of adjacent printing layers are greatly different. To avoid an excessively large difference between the corrected exposure time of the current printing layer and an exposure time of the previous printing layer, when the quantity of pixels of the current printing layer is less than the quantity of pixels of the previous printing layer, the second product of the first threshold and the exposure time difference is used as a maximum correction amount of the exposure time: or when the quantity of pixels of the current printing layer is greater than the quantity of pixels of the previous printing layer, the fourth product of the second threshold and the exposure time coefficient is used as a maximum correction amount of the exposure time, to adjust the exposure time of the current printing layer.

In this embodiment, the exposure time of the current printing layer can better meet an actual requirement for exposure time, and a possibility of cracking between two adjacent printing layers in the second-type slice can also be reduced, preventing a protrusion between the current printing layer and the previous printing layer and helping improve the printing quality of the model.

The foregoing method is described by using a specific example. For example, the first threshold is set to 0.6, and the second threshold is set to 2. When the quantity of pixels of the current layer is equal to the quantity of pixels of the previous layer, the exposure time of the current layer is calculated through arithmetic decreasing based on the exposure time coefficient. When the quantity of pixels of the current layer is greater than or less than the quantity of pixels of the previous layer, the exposure time coefficient mul is first calculated based on the quotient of the quantity of pixels of the current layer and the quantity of pixels of the previous layer. When the exposure time coefficient mul is less than 1 and greater than 0.6, the exposure time coefficient mul is multiplied by the exposure time difference to obtain the first product, and the first product is subtracted from a theoretical exposure time (namely, the theoretical exposure time is the exposure time before correction) calculated through arithmetic decreasing, to obtain the corrected exposure time of the current printing layer. When the exposure time coefficient mul is less than 0.6, 0.6 is multiplied by the exposure time difference to obtain the second product, and the second product is subtracted from a theoretical exposure time (namely, the exposure time before correction) calculated through arithmetic decreasing, to obtain the corrected exposure time of the current printing layer. When the exposure time coefficient mul is greater than 1 and less than 2, the exposure time coefficient mul is multiplied by the exposure time difference to obtain the third product, and the third product is added to a theoretical exposure time (namely, the exposure time before correction) calculated through arithmetic decreasing, to obtain the corrected exposure time of the current printing layer. When the exposure time coefficient mul is greater than 2, 2 is multiplied by the exposure time difference to obtain the fourth product, and the fourth product is added to theoretical exposure time (namely, the exposure time before correction) calculated through arithmetic decreasing, to obtain the corrected exposure time of the current printing layer.

Further, in this embodiment, the foregoing control method further includes the following steps.

S301. Obtain a total quantity of printing layers for the model to be printed, a quantity of printing layers for the first-type slice, and the quantity of printing layers for the second-type slice.

S302: Determine a quantity of printing layers for the third-type slice based on the total quantity of printing layers, the quantity of printing layers for the first-type slice, and the quantity of printing layers for the second-type slice.

It can be understood that the total quantity of printing layers of the model to be printed is determined by a model height, a layer thickness, and the presence of bottom layers. The layer thickness is a thickness of each printing layer of the model to be printed. To be specific, the total quantity of printing layers=the model height/the layer thickness. In this case, the quantity of printing layers for the third-type slice=the total quantity of printing layers−the quantity of printing layers for the first-type slice−the quantity of printing layers for the second-type slice.

In an actual application scenario, a specific example is used for description. For example, bottom layers need to be added to the model to be printed, a quantity of bottom layers is set to 5 and a layer thickness is set to 0.05 mm through slicing software, a height of the model to be printed that is obtained by the slicing software is 5 cm, and the quantity of printing layers for the second-type slice is 10. In this case, the total quantity of printing layers is equal to 5 cm divided by 0.05 mm, that is, 1000. The first five layers of the total quantity of printing layers serve as bottom layers, that is, a quantity of bottom layers is 5. Therefore, a quantity of layers for the third-type slice=1000−5−10=985, that is, the quantity of printing layers for the third-type slice is 985. If no bottom layer needs to be added to the model to be printed, a quantity of layers of the third-type slice=1000−1−10=989.

Specifically, the quantity of printing layers for the first-type slice is less than or equal to 20. The quantity of printing layers for the second-type slice may be generated through calculation based on the quantity of printing layers for the first-type slice. The quantity of printing layers for the first-type slice and the quantity of printing layers for the second-type slice are in a preset multiple relationship. For example, the quantity of printing layers for the second-type slice is set to be twice the quantity of printing layers for the first-type slice. Alternatively, the quantity of printing layers for the second-type slice may be generated through calculation based on the quantity of printing layers for the third-type slice. The quantity of printing layers for the third-type slice and the quantity of printing layers for the second-type slice are in a preset multiple relationship. For example, the quantity of printing layers for the second-type slice is set to be one thousandth of the quantity of printing layers for the third-type slice. Alternatively, the quantity of printing layers for the second-type slice may be generated through calculation based on the quantity of printing layers for the first-type slice and the quantity of printing layers for the third-type slice. Alternatively, the quantity of printing layers for the second-type slice is a preset fixed value. For example, the quantity of printing layers for the second-type slice is set to 10.

It can be understood that the control method for 3D printing described in the foregoing embodiments may be applied to slicing software or a 3D printing equipment, or may be jointly performed by slicing software and a 3D printing equipment.

Figure 4:
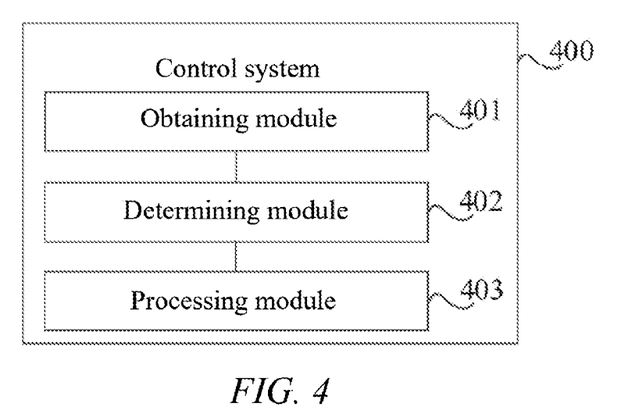
FIG. 4 is a schematic diagram of a structure of a control system according to an embodiment of the present application.

As shown in FIG. 4, as a specific implementation of the foregoing control method for 3D printing, an embodiment of the present application provides a control system 400. The control system 400 includes: an obtaining module 401, a determining module 402, and a processing module 403.

The obtaining module 401 is configured to: obtain at least one parameter of an exposure time of a first-type slice and an exposure time of a third-type slice of a model to be printed; and obtain a quantity of printing layers for a second-type slice of the model to be printed; The determining module 402 is configured to determine an exposure time of the second-type slice based on the at least one parameter of the exposure time of the first-type slice and the exposure time of the third-type slice, and the quantity of printing layers for the second-type slice. The processing module 403 is configured to process the model to be printed based on the exposure time of the first-type slice, the exposure time of the second-type slice, and the exposure time of the third-type slice.

In this embodiment, the control system may be set in slicing software or a 3D printing equipment. A plurality of printing layers and printing parameters of the model to be printed are obtained during model printing, to instruct, based on the printing parameters, the three-dimensional printing equipment to print the model to be printed. Further, the plurality of printing layers of the model to be printed are divided into three types: the first-type slice, the second-type slice, and the third-type slice. Therefore, when a printing operation is performed on the model to be printed, the exposure time of the second-type slice is appropriately set, so that the second-type slice can connect the first-type slice and the third-type slice, preventing the third-type slice from falling off due to a large difference between the exposure time of the third-type slice and the exposure time of the first-type slice. This not only ensures good adhesion between a printed first-type slice and a printing platform, but also enhances connection strength between printing layers of the model to be printed, which reduces a possibility of cracking and helps improve the printing quality of the model.

Specifically, the determining module 402 is specifically configured to: determine an exposure time of the second-type slice based on the exposure time of the first-type slice or the exposure time of the third-type slice, and the quantity of printing layers for the second-type slice; or determine an exposure time of the second-type slice based on the exposure time of the first-type slice and the exposure time of the third-type slice, and the quantity of printing layers for the second-type slice.

Specifically, the determining module 402 is specifically configured to: obtain a preset exposure time difference of the second-type slice; and determine the exposure time of the second-type slice based on the exposure time of the first-type slice or the exposure time of the third-type slice, the quantity of printing layers for the second-type slice, and the preset exposure time difference.

Specifically, the determining module 402 is specifically configured to: calculate a difference between the exposure time of the first-type slice and the exposure time of the third-type slice; determine a quotient of the difference and the quantity of printing layers for the second-type slice as an exposure time difference between two adjacent printing layers in the second-type slice; and perform an iterative operation based on one of the exposure time of the first-type slice and the exposure time of the third-type slice, and the exposure time difference, to determine an exposure time of each printing layer for the second-type slice.

Specifically, the obtaining module 401 is further configured to obtain a quantity of pixels of a current printing layer for the second-type slice and a quantity of pixels of a previous printing layer; and the control system 400 further includes: an update module (not shown in the figure), configured to update an exposure time of the current printing layer based on a relationship between the quantity of pixels of the current printing layer and the quantity of pixels of the previous printing layer.

Specifically, the update module is specifically configured to: obtain a ratio of the quantity of pixels of the current printing layer to the quantity of pixels of the previous printing layer as an exposure time coefficient, when the quantity of pixels of the current printing layer is not equal to the quantity of pixels of the previous printing layer; and update the exposure time of the current printing layer based on the exposure time coefficient and the exposure time difference, or based on the exposure time coefficient and an exposure time before correction.

Specifically, the update module is specifically configured to: when the exposure time coefficient is less than 1 and greater than a first threshold, obtain a first product of the exposure time coefficient and the exposure time difference, and use a difference obtained by subtracting the first product from the exposure time before correction as a corrected exposure time of the current printing layer; when the exposure time coefficient is less than or equal to the first threshold, obtain a second product of the first threshold and the exposure time difference, and use a difference obtained by subtracting the second product from the exposure time before correction as a corrected exposure time of the current printing layer; when the exposure time coefficient is greater than 1 and less than a second threshold, obtain a third product of the exposure time coefficient and the exposure time difference, and use a sum of the exposure time before correction and the third product as a corrected exposure time of the current printing layer; or when the exposure time coefficient is greater than or equal to the second threshold, obtain a fourth product of the second threshold and the exposure time difference, and use a sum of the exposure time before correction and the fourth product as a corrected exposure time of the current printing layer.

Specifically, the obtaining module 401 is further configured to: obtain a total quantity of printing layers for the model to be printed, a quantity of printing layers for the first-type slice, and the quantity of printing layers for the second-type slice; and determine a quantity of printing layers for the third-type slice based on the total quantity of printing layers, the quantity of printing layers for the first-type slice, and the quantity of printing layers for the second-type slice; where the quantity of printing layers for the first-type slice is less than or equal to 20, and the quantity of printing layers for the second-type slice is generated through calculation based on at least one of the quantity of printing layers for the first-type slice and the quantity of printing layers for the third-type slice; or the quantity of printing layers for the second-type slice is a preset fixed value.

For specific definitions of the control system, refer to the foregoing definitions of the control method for 3D printing. Details are not described herein again. All or some of the modules in the control system may be implemented by software, hardware, and a combination thereof. The foregoing modules may be embedded in or independent of a processor of a computer device in the form of hardware, or may be stored in a memory of a computer device in the form of software, so that the processor can invoke the modules to perform operations corresponding to the modules.

Based on the methods shown in FIG. 1 and FIG. 2, correspondingly, an embodiment of the present application further provides a computer-readable storage medium, where the computer-readable storage medium stores a computer program, and the computer program is configured to; when running, perform the control method for 3D printing in the foregoing embodiments.

Based on such an understanding, the technical solutions in the present application may be embodied in the form of a software product. The software product may be stored in a non-volatile storage medium (which may be a CD-ROM, a USB flash drive, a removable hard disk, or the like), and includes a plurality of instructions to cause a three-dimensional printing equipment to perform the control method for 3D printing in various application scenarios of the present application.

An embodiment of the present application further provides a 3D printing equipment, and the 3D printing equipment includes a memory and a processor. The memory is configured to store a computer program. The processor is configured to invoke the computer program to perform, on a model to be printed, the control method for 3D printing in the foregoing embodiments.

Optionally, the 3D printing equipment may further include a user interface, a network interface, a camera, a radio frequency (RF) circuit, a sensor, an audio circuit, a Wi-Fi module, and the like. The user interface may include a display, an input unit such as a keyboard, and the like. An optional user interface may alternatively include a USB interface, a card reader interface, and the like. Optionally, the network interface may include a standard wired interface, a wireless interface (such as a Bluetooth interface or a Wi-Fi interface), and the like.

In a specific application scenario, the 3D printing equipment may be an LCD photocuring 3D printer or a projection photocuring 3D printer.

Those skilled in the art can understand that the structure of the three-dimensional printing equipment provided in this embodiment does not constitute a limitation on the three-dimensional printing equipment. The three-dimensional printing equipment may include more or fewer components, or some components may be combined, or there may be a different component arrangement.

The storage medium may further include an operating system and a network communication module. The operating system is a program that manages and stores hardware and software resources of the computer device, and supports the running of information processing programs and other software and/or programs. The network communication module is configured to implement the communication between various components in the storage medium, as well as the communication with other hardware and software in the physical device.

According to the foregoing descriptions of the implementations, those skilled in the art can clearly understand that, in the present application, the following operations may be implemented by software in combination with a necessary common hardware platform, or may be implemented by hardware: obtaining at least one parameter of an exposure time of a first-type slice and an exposure time of a third-type slice of a model to be printed, and obtaining a quantity of printing layers for a second-type slice of the model to be printed; determining an exposure time of the second-type slice based on the at least one parameter of the exposure time of the first-type slice and the exposure time of the third-type slice, and the quantity of printing layers for the second-type slice; and processing the model to be printed based on the exposure time of the first-type slice, the exposure time of the second-type slice, and the exposure time of the third-type slice.

In this embodiment of the present application, a plurality of printing layers and printing parameters of the model to be printed are obtained during model printing, to instruct, based on the printing parameters, the three-dimensional printing equipment to print the model to be printed. Further, the plurality of printing layers of the model to be printed are divided into three types: the first-type slice, the second-type slice, and the third-type slice. Therefore, when a processing operation is performed on the model to be printed, the exposure time of the second-type slice is appropriately set, so that the second-type slice can connect the first-type slice and the third-type slice, preventing the third-type slice from falling off due to a large difference between the exposure time of the third-type slice and the exposure time of the first-type slice. This not only ensures good adhesion between a printed first-type slice and a printing platform, but also enhances connection strength between printing layers of the model to be printed, which reduces a possibility of cracking and helps improve the printing quality of the model.

Those skilled in the art can understand that the accompanying drawings are only schematic diagrams of a preferred implementation scenario, and the modules or processes in the accompanying drawings are not necessarily required for implementing the present application. Those skilled in the art can understand that the modules in the apparatus in the implementation scenario may be distributed in the apparatus in the implementation scenario according to the description of the implementation scenario, or may be located in one or more apparatuses different from the implementation scenario with corresponding changes. The modules of the foregoing implementation scenario may be combined into one module, or may be further split into a plurality of sub-modules.

The foregoing numerals in the present application are only for description, and do not represent the superiority or inferiority of the implementation scenarios. Disclosed above are only several specific implementation scenarios of the present application, but the present application is not limited thereto. Any variations readily figured out by those skilled in the art shall fall within the scope of protection of the present application.

What is claimed is:

1. A control method for 3D printing, comprising:
    obtaining at least one parameter of an ultraviolet (UV) exposure time of a first-type slice and a UV exposure time of a third-type slice of a model to be printed;
    obtaining a quantity of printing layers for a second-type slice of the model to be printed;
    determining a UV exposure time of the second-type slice based on the quantity of printing layers for the second-type slice, and the at least one parameter of the UV exposure time of the first-type slice and the UV exposure time of the third-type slice; and
    processing the model to be printed based on the UV exposure time of the first-type slice, the UV exposure time of the second-type slice, and the UV exposure time of the third-type slice,
    wherein the second-type slice is located between the first-type slice and the third-type slice, and the first-type slice is bottom layers of the model to be printed or a first printing layer.

2. The control method according to claim 1, wherein the step of determining the UV exposure time of the second-type slice based on the quantity of printing layers for the second-type slice, and the at least one parameter of the UV exposure time of the first-type slice and the UV exposure time of the third-type slice comprises:
    obtaining a preset exposure time difference of the second-type slice; and
    determining the UV exposure time of the second-type slice based on the UV exposure time of the first-type slice or the UV exposure time of the third-type slice, the quantity of printing layers for the second-type slice, and the preset exposure time difference.

3. The control method according to claim 1, wherein the step of determining the UV exposure time of the second-type slice based on the quantity of printing layers for the second-type slice, and the at least one parameter of the UV exposure time of the first-type slice and the UV exposure time of the third-type slice comprises:
    calculating a difference between the UV exposure time of the first-type slice and the UV exposure time of the third-type slice;
    determining a quotient of the difference and the quantity of printing layers for the second-type slice as an exposure time difference of two adjacent printing layers in the second-type slice; and
    performing an iterative operation based on one of the UV exposure time of the first-type slice and the UV exposure time of the third-type slice, and the exposure time difference, to determine a UV exposure time of each printing layer in the second-type slice.

4. The control method according to claim 2, further comprising:
obtaining a quantity of pixels of a current printing layer for the second-type slice and a quantity of pixels of a previous printing layer of the current printing layer; and
updating a UV exposure time of the current printing layer based on a relationship between the quantity of pixels of the current printing layer and the quantity of pixels of the previous printing layer.

5. The control method according to claim 4, wherein the step of updating the UV exposure time of the current printing layer based on the relationship between the quantity of pixels of the current printing layer and the quantity of pixels of the previous printing layer comprises:
obtaining a ratio of the quantity of pixels of the current printing layer to the quantity of pixels of the previous printing layer as an exposure time coefficient, when the quantity of pixels of the current printing layer is not equal to the quantity of pixels of the previous printing layer; and
updating the UV exposure time of the current printing layer based on the exposure time coefficient and the exposure time difference, or based on the exposure time coefficient and a UV exposure time before correction.

6. The control method according to claim 5, wherein the step of updating the UV exposure time of the current printing layer based on the exposure time coefficient and the exposure time difference comprises:
when the exposure time coefficient is less than 1 and the exposure time coefficient is greater than a first threshold, obtaining a first product of the exposure time coefficient and the exposure time difference, and using a difference obtained by subtracting the first product from the UV exposure time before correction as a first corrected UV exposure time of the current printing layer;
when the exposure time coefficient is less than or equal to the first threshold, obtaining a second product of the first threshold and the exposure time difference, and using a difference obtained by subtracting the second product from the UV exposure time before correction as a second UV corrected exposure time of the current printing layer;
when the exposure time coefficient is greater than 1 and the exposure time coefficient is less than a second threshold, obtaining a third product of the exposure time coefficient and the exposure time difference, and using a sum of the UV exposure time before correction and the third product as a third corrected UV exposure time of the current printing layer; and
when the exposure time coefficient is greater than or equal to the second threshold, obtaining a fourth product of the second threshold and the exposure time difference, and using a sum of the UV exposure time before correction and the fourth product as a fourth corrected UV exposure time of the current printing layer.

7. The control method according to claim 1, further comprising:
obtaining a total quantity of printing layers for the model to be printed, a quantity of printing layers for the first-type slice, and the quantity of printing layers for the second-type slice; and
determining a quantity of printing layers for the third-type slice based on the total quantity of printing layers, the quantity of printing layers for the first-type slice, and the quantity of printing layers for the second-type slice;
wherein the quantity of printing layers for the first-type slice is less than or equal to 20, and the quantity of printing layers for the second-type slice is generated through calculation based on at least one of the quantity of printing layers for the first-type slice and the quantity of printing layers for the third-type slice; or the quantity of printing layers for the second-type slice is a preset fixed value.

8. A control system, comprising:
an obtaining module, configured to: obtain at least one parameter of an ultraviolet (UV) exposure time of a first-type slice and a UV exposure time of a third-type slice of a model to be printed; and obtain a quantity of printing layers for a second-type slice of the model to be printed;
a determining module, configured to determine a UV exposure time of the second-type slice based on the quantity of printing layers for the second-type slice, and the at least one parameter of the UV exposure time of the first-type slice and the UV exposure time of the third-type slice; and
a processing module, configured to process the model to be printed based on the UV exposure time of the first-type slice, the UV exposure time of the second-type slice, and the UV exposure time of the third-type slice,
wherein the second-type slice is located between the first-type slice and the third-type slice, and the first-type slice is bottom layers of the model to be printed or a first printing layer.

9. A non-transitory computer-readable storage medium, storing a computer program, wherein the computer program is configured to perform the control method for 3D printing according to claim 1.

10. A 3D printing equipment, comprising:
a memory, configured to store a computer program; and
a processor, configured to invoke the computer program to perform, on the model to be printed, the control method for 3D printing according to claim 1.

11. The control method according to claim 3, further comprising:
obtaining a quantity of pixels of a current printing layer for the second-type slice and a quantity of pixels of a previous printing layer of the current printing layer; and
updating a UV exposure time of the current printing layer based on a relationship between the quantity of pixels of the current printing layer and the quantity of pixels of the previous printing layer.

12. The 3D printing equipment according to claim 10, wherein in the control method, the step of determining the UV exposure time of the second-type slice based on the at least one parameter of the UV exposure time of the first-type slice and the UV exposure time of the third-type slice, and the quantity of printing layers for the second-type slice comprises:
obtaining a preset exposure time difference of the second-type slice; and
determining the UV exposure time of the second-type slice based on the UV exposure time of the first-type slice or the UV exposure time of the third-type slice, the quantity of printing layers for the second-type slice, and the preset exposure time difference.

13. The 3D printing equipment according to claim 10, wherein in the control method, the step of determining the UV exposure time of the second-type slice based on the at least one parameter of the UV exposure time of the first-type slice and the UV exposure time of the third-type slice, and the quantity of printing layers for the second-type slice comprises:
 calculating a difference between the UV exposure time of the first-type slice and the UV exposure time of the third-type slice;
 determining a quotient of the difference and the quantity of printing layers for the second-type slice as an exposure time difference of two adjacent printing layers in the second-type slice; and
 performing an iterative operation based on one of the UV exposure time of the first-type slice and the UV exposure time of the third-type slice, and the exposure time difference, to determine a UV exposure time of each printing layer in the second-type slice.

14. The 3D printing equipment according to claim 12, wherein the control method further comprises:
 obtaining a quantity of pixels of a current printing layer for the second-type slice and a quantity of pixels of a previous printing layer of the current printing layer; and
 updating a UV exposure time of the current printing layer based on a relationship between the quantity of pixels of the current printing layer and the quantity of pixels of the previous printing layer.

15. The 3D printing equipment according to claim 14, wherein in the control method, the step of updating the UV exposure time of the current printing layer based on the relationship between the quantity of pixels of the current printing layer and the quantity of pixels of the previous printing layer comprises:
 obtaining a ratio of the quantity of pixels of the current printing layer to the quantity of pixels of the previous printing layer as an exposure time coefficient, when the quantity of pixels of the current printing layer is not equal to the quantity of pixels of the previous printing layer; and
 updating the UV exposure time of the current printing layer based on the exposure time coefficient and the exposure time difference, or based on the exposure time coefficient and a UV exposure time before correction.

16. The 3D printing equipment according to claim 15, wherein in the control method, the step of updating the UV exposure time of the current printing layer based on the exposure time coefficient and the exposure time difference comprises:
 when the exposure time coefficient is less than 1 and the exposure time coefficient is greater than a first threshold, obtaining a first product of the exposure time coefficient and the exposure time difference, and using a difference obtained by subtracting the first product from the UV exposure time before correction as a first corrected UV exposure time of the current printing layer;
 when the exposure time coefficient is less than or equal to the first threshold, obtaining a second product of the first threshold and the exposure time difference, and using a difference obtained by subtracting the second product from the UV exposure time before correction as a second corrected UV exposure time of the current printing layer;
 when the exposure time coefficient is greater than 1 and the exposure time coefficient is less than a second threshold, obtaining a third product of the exposure time coefficient and the exposure time difference, and using a sum of the UV exposure time before correction and the third product as a third corrected UV exposure time of the current printing layer; and
 when the exposure time coefficient is greater than or equal to the second threshold, obtaining a fourth product of the second threshold and the exposure time difference, and using a sum of the UV exposure time before correction and the fourth product as a fourth corrected UV exposure time of the current printing layer.

17. The 3D printing equipment according to claim 10, wherein the control method further comprises:
 obtaining a total quantity of printing layers for the model to be printed, a quantity of printing layers for the first-type slice, and the quantity of printing layers for the second-type slice; and
 determining a quantity of printing layers for the third-type slice based on the total quantity of printing layers, the quantity of printing layers for the first-type slice, and the quantity of printing layers for the second-type slice;
 wherein the quantity of printing layers for the first-type slice is less than or equal to 20, and the quantity of printing layers for the second-type slice is generated through calculation based on at least one of the quantity of printing layers for the first-type slice and the quantity of printing layers for the third-type slice; or the quantity of printing layers for the second-type slice is a preset fixed value.

18. The non-transitory computer-readable storage medium according to claim 9, wherein in the control method, the step of determining the UV exposure time of the second-type slice based on the at least one parameter of the UV exposure time of the first-type slice and the UV exposure time of the third-type slice, and the quantity of printing layers for the second-type slice comprises:
 obtaining a preset exposure time difference of the second-type slice; and
 determining the UV exposure time of the second-type slice based on the UV exposure time of the first-type slice or the UV exposure time of the third-type slice, the quantity of printing layers for the second-type slice, and the preset exposure time difference.

19. The non-transitory computer-readable storage medium according to claim 9, wherein in the control method, the step of determining the UV exposure time of the second-type slice based on the at least one parameter of the UV exposure time of the first-type slice and the UV exposure time of the third-type slice, and the quantity of printing layers for the second-type slice comprises:
 calculating a difference between the UV exposure time of the first-type slice and the UV exposure time of the third-type slice;
 determining a quotient of the difference and the quantity of printing layers for the second-type slice as an exposure time difference of two adjacent printing layers in the second-type slice; and
 performing an iterative operation based on one of the UV exposure time of the first-type slice and the UV exposure time of the third-type slice, and the exposure time difference, to determine a UV exposure time of each printing layer in the second-type slice.

20. The non-transitory computer-readable storage medium according to claim 18, wherein the control method further comprises:
 obtaining a quantity of pixels of a current printing layer for the second-type slice and a quantity of pixels of a previous printing layer of the current printing layer; and
 updating a UV exposure time of the current printing layer based on a relationship between the quantity of pixels of the current printing layer and the quantity of pixels of the previous printing layer.

* * * * *